United States Patent Office 3,417,206
Patented Dec. 17, 1968

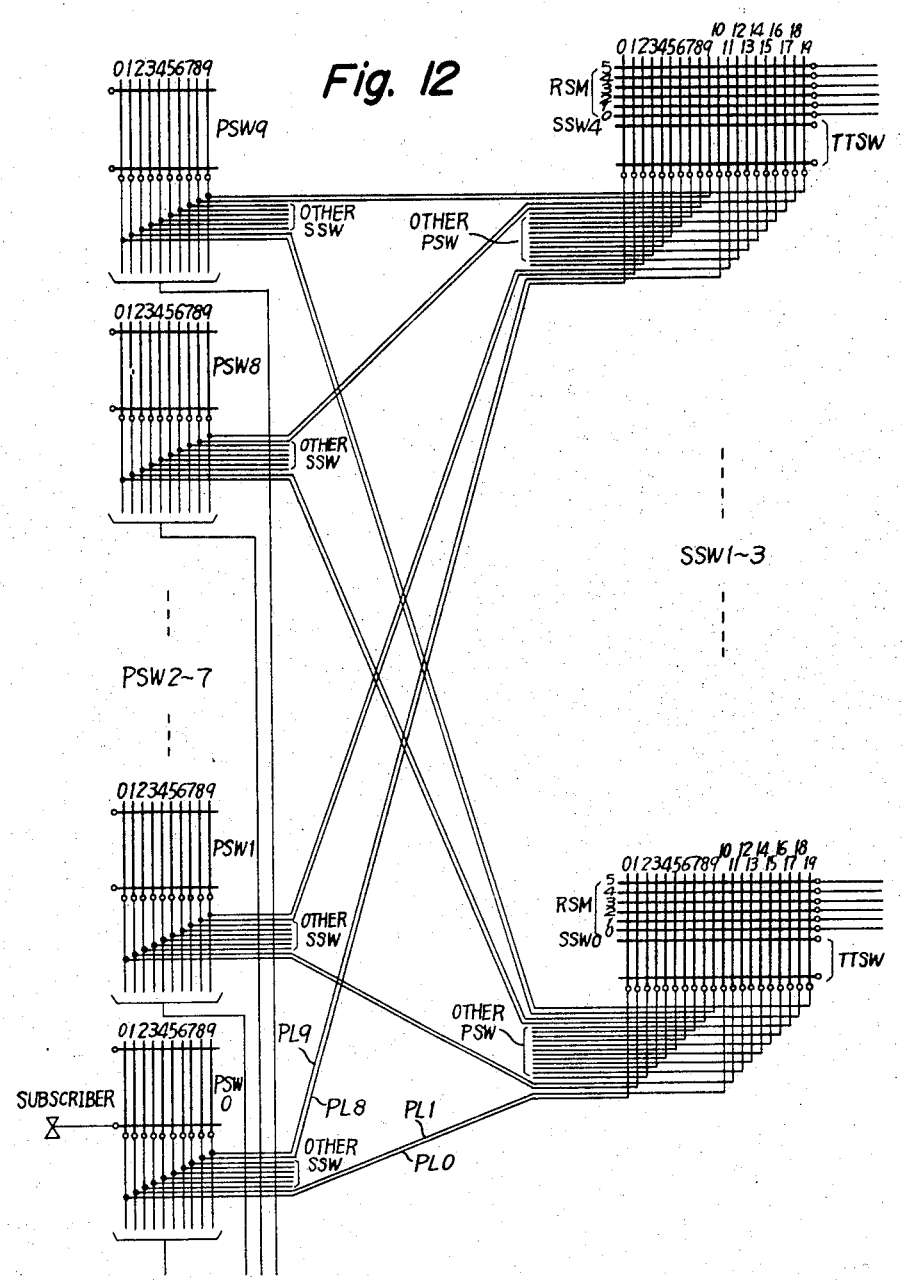

3,417,206
CROSSBAR SWITCHING SYSTEM PROVIDING AN INCREASED NUMBER OF POSSIBLE PATHS TO A SELECTED REGISTERED GROUP
Kazuhiko Wakabayashi, Chiaki Ii, Toru Ohno, and Kazuo Ito, Yokohama, Japan, assignors to Hitachi, Ltd., Tokyo, Japan, a corporation of Japan
Continuation of application Ser. No. 342,631, Feb. 5, 1964. This application Sept. 14, 1967, Ser. No. 667,862
Claims priority, application Japan, Feb. 8, 1963, 38/5,525
10 Claims. (Cl. 179—22)

ABSTRACT OF THE DISCLOSURE

A telephone switching system including a multi-frame switching frame having a plurality of switch units in each frame and links connecting each switch unit of the first stage to each switch unit of the last stage, the outlets of each switch unit of the last stage being subdivided into first and second sub-groups with each sub-group of a switch unit being connected along with a sub-group of another switch unit to a respective group of registers to thereby increase the number of possible paths between a subscriber and a selected group of registers through said switching frame.

This application is a continuation of Ser. No. 342,631 filed Feb. 5, 1964 and now abandoned.

This invention relates generally to automatic switching systems and more particularly to a multistage switching system of so-called crossbar type.

In a multistage switching system, the number of switches in the last stage of a switching frame, or switches at which outlets therefrom terminate must be increased in order to provide a greater number of outlets from the switching frame. An attempt to increase the number of outlets while keeping the number of the last stage switches fixed will result in a deficiency of the number of links that can be connected to the respective switches disposed in the last stage of the switching frame. This means a decrease in the number of connecting paths or channels available for common control means or a marker when the marker selects an idle outlet and then selects one of the channels between a calling line and the selected outlet. In other words, the marker cannot select an idle and available channel in a single selecting action, and probability of recycles by the marker or repetition of the above selecting action on other outlets will increase. This will eventually result in an increased holding time for the marker.

The primary object of the invention is to provide economical means by which traffic of a wide range can be dealt with without increasing the number of switches in a switching frame and without decreasing the number of outlets therefrom.

Another object of the invention is to provide means for reducing congestion on a switching frame and decreasing the number of recycles by common control means or a marker during the channel selection in spite of any variation in the number of links that can be connected to one of the outlets.

According to a conventional practice, entire outlets from a switching frame are divided into groups for connection with corresponding switch units in the last stage, in which an idle outlet is selected in a manner that the groups of outlets are tested one after another for the presence of idle and available outlets for selecting one group out of them, the outlets of the selected group are locked out by lock-out means associated with that particular group and then one idle outlet is selected from the selected group of outlets, and one idle channel between the idle outlet and a calling line is finally selected. However, such division of outlets into fixed lock-out groups corresponding to a plurality of switch units inevitably results in a decrease in the number of lock-out units due to decrease in the number of available groups of outlets, hence in a greater probability for a marker to wait.

The present invention is characterized in that said objects can be attained by a unique arrangement, in which outlets of any outlet group are suitably divided for separate termination at a plurality of switch units without decreasing the number of available groups of outlets, and a marker is adapted to simultaneously test channels having access to a plurality of such switch units for selecting one channel out of them.

The invention is further characterized in that, since the outlets of any one outlet group are divided for separate termination at a plurality of switch units, the outlets can readily be connected in multiple between the switch units. By virtue of this feature, the number of connecting paths which can be connected with any selected outlet can be increased, and it is possible to provide a switching frame having a reduced probability of congestion.

The invention is further characterized in that, owing to the constitution of the circuit arrangement wherein said multiple connection of outlets can be attained by an extremely little modification in the circuit arrangement, it is possible to effect in an extremely easy and economical manner a desired variation in the arrangement of said switching frame, that is, to make or remove the multiple connection of the outlets as desired.

According to the invention, there is provided a crossbar switching system comprising a multistage switching frame having crossbar switches arranged in a plurality of stages, said switches in each stage being divided into a plurality of switch units, inlets to said switch units in the first stage from subscriber lines, outlets from said switch units in the last stage and divided into groups each forming a lock-out unit, at least one group of said outlets being subdivided for separate termination at a plurality of said switch units in the last stage, and channels or connecting paths connecting any one of said first stage switch units with any one of said last stage switch units, and common control means associated with said multistage switching frame, said common control means being operative to simultaneously test for and select said connecting paths connecting between a calling subscriber line and said last stage switch units at which a desired outlet terminates, whereby congestion on said switching frame and the number of recycles by said common control means can be reduced to a minimum.

The foregoing and other objects and features of the present invention will be apparent from the following detailed description of an exemplary embodiment in connection with the drawings in which:

FIGS. 7, 8, 9, 10 and 11 show a channel test circuit, a line link frame connector and a line link frame;

FIGS. 12 and 13 show a link arrangement and originating register appearance of a line link frame;

FIG. 20 is a diagram showing the arrangement of FIGS. 3 to 16.

Figure 1:
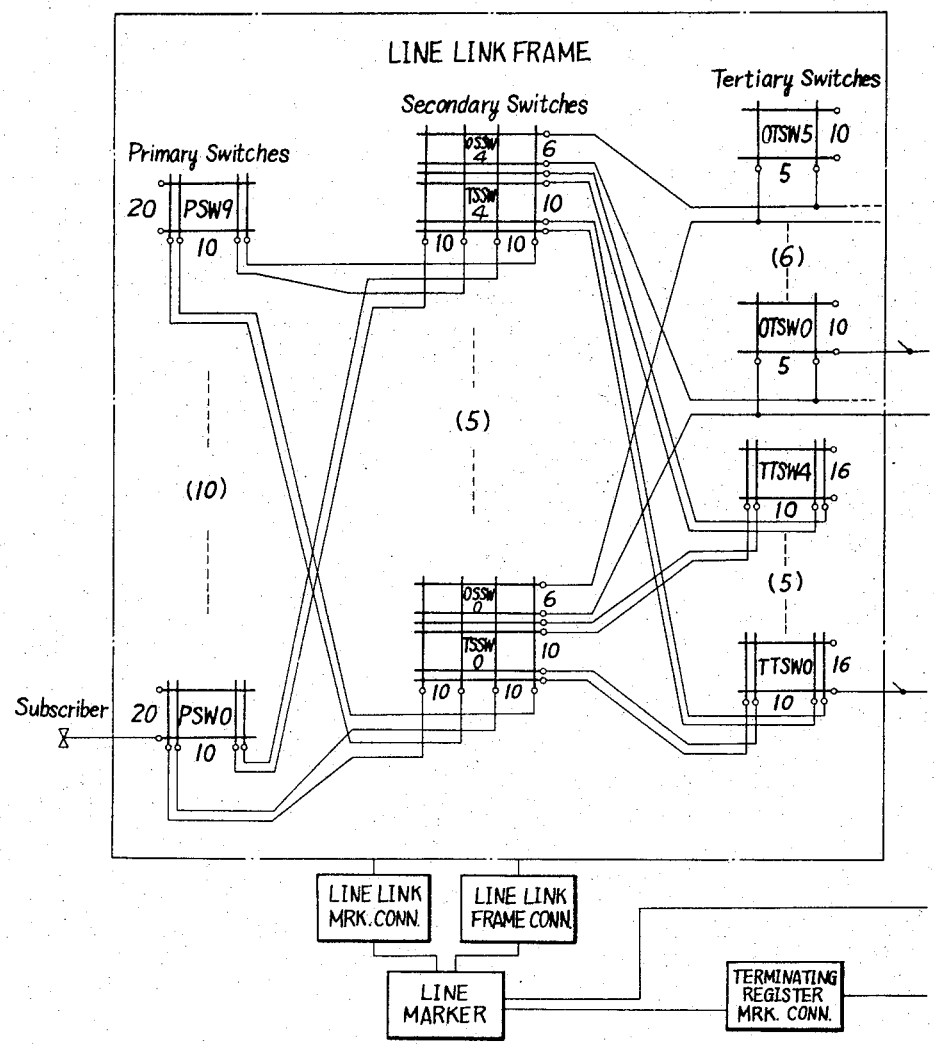
FIGS. 1 and 2 show a trunking diagram of an automatic switching system embodying the present invention.
Figure 2:
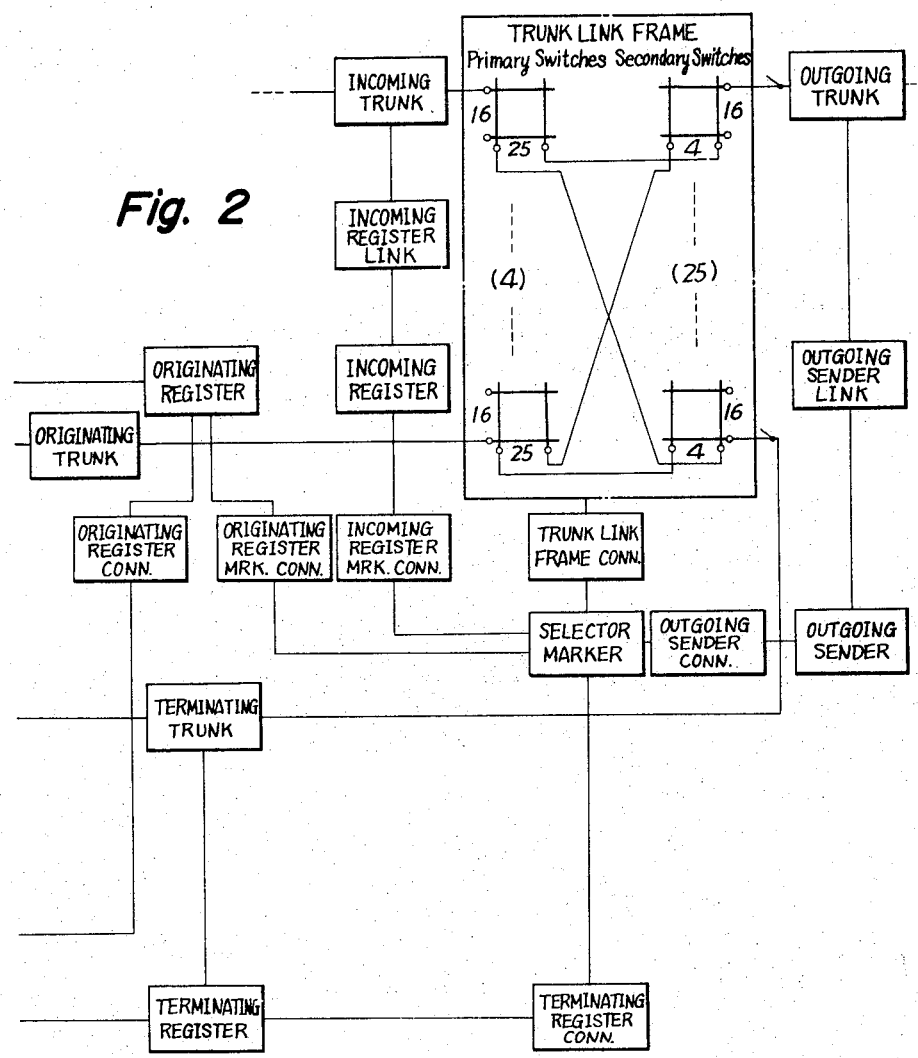

Referring first to FIGS. 1 and 2, the outline of the trunking scheme will be explained. Though only one line link frame and trunk link frame are shown in these drawings, it will be understood that there are a plurality of line link frames and trunk link frames actually.

Each line link frame consists of crossbar switches of six wire type having ten horizontals and twenty verticals arranged in three stages, namely, primary switches, secondary switches and tertiary switches. These switches may be used as crossbar switch units of three wire type having sixteen horizontals by splitting the crosspoint contacts and having a required number of articles by dividing into several crosspoint multiple subgroups or by connecting in multiple two or more switches. The method of splitting the crosspoint contacts is the same as that disclosed in "160-trunk incoming frames," Bell Laboratories Record, January, 1942, p. 114. The subscriber lines are connected to the horizontals of the primary switch units PSW0 to PSW9, and the tertiary switches are divided into two groups for originating calls and for terminating calls, while the orginating registers are connected to the horizontals of the originating tertiary switch units OTSW0 to OTSW5 and the terminating trunks connected to the horizontals of the terminating tertiary switch units TTSW0 to TTSW4. The primary links connecting between the primary switches and the secondary switches are used for both originating and terminating calls in common, while the secondary links connecting between the secondary switches and the tertiary switches are divided into two groups of orginating secondary links and terminating secondary links. The originating secondary links have a function of changing over the outlets of the secondary switches between the originating tertiary switches and trunk link frames and are also called originating trunks. This change-over function is effected by the off normal contacts of the hold magnets of the tertiary switches, i.e., the outlets of the secondary switches are connected with the originating registers via the crosspoints of the tertiary switches while the hold magnets of the tertiary switches are operating, but when the hold magnets are released these are extended to the trunk link frames. The outlets of the teriary switches are connected in multiple to the corresponding outlets of tertiary switches of the other line link frames. The number of the line link frames connected together in multiple is determined by a traffic condition. The number of subscriber lines appearing on a line link frame can be increased by adding additional switch units connected in vertical multiple with primary switches.

Each trunk link frame consists of crossbar switches of the same type as above described. The primary switches are used as four switch units of three wire type having sixteen horizontals and twenty five verticals and the secondary switches are used as twenty-five switch units of three wire type having sixteen horizontals and four verticals. The horizontals of the primary switches are conected to the originating trunks and incoming trunks, and the horizontals of the secondary switches are connected to the outgoing trunks, terminating trunks and special purpose trunks (not shown) such as tone trunks. All of the primary switch units and the secondary switch units are connected together so that there is one link connecting each primary switch unit with each secondary switch unit. The outlets of the trunk link frame are connected in multiple to the corresponding outlets of the other trunk link frames. The number of the outlets can be increased by adding additional switch units connected in vertical multiple with the secondary switches.

All switching operations are under the control of common markers, namely line markers for controlling the line link frames and selector markers for controlling the trunk link frames, to which connection is made by a variety of connectors. Each line link frame has an individual line link marker connector and an individual line link frame connector, the former operating under the control of the line link frame to connect the line link frame with the line marker and the latter operating under the control of the line marker to connect the line marker with the line link frame. Each trunk link frame has an individual trunk link frame connector by which the selector marker has access to the associated trunk link frame.

To assist the markers and to shorten the time during which they have to be employed with each call, originating registers, incoming registers, terminating registers and outgoing senders are employed for receiving and transmitting line designations. Originating registers are connected with the calling line by the line marker so as to operate in response to an originating call. An originating register marker connector is employed to connect any one of a group of originating registers with any idle selector marker and an originating register connector is employed to connect the line marker with any idle originating registers. Incoming registers are attached to incoming trunks over an incoming register link and are arranged to receive the numerical designations from the distant office, different incoming registers being employed to receive dial pulses or multi-frequency pulses according to the nature of the distant office and different links being employed to connect the different types of registers with their associated trunks. An incoming register marker connector is employed to connect any one of a group of incoming registers with any idle selector marker. Terminating registers are used to transmit the called line designations from the selector marker to the line marker. A terminating register connector is employed to connect the selector marker with the terminating register. A terminating register marker connector is employed to connect any one of a group of terminating registers with any idle line marker. The line link marker connectors and the terminating register marker connectors are arranged in a predetermined order in a preference chain with the line marker. The originating register marker connectors and the incoming register marker connectors are arranged in a predetermined order in a preference chain with the selector marker.

Outgoing trunks to offices requiring the transmission of the line designation to the distant office are connected with outgoing senders by means of an outgoing sender link. These outgoing senders are also of a plurality of types in accordance with the type of pulsing required by the distant office and are selected by the selector marker through an outgoing sender connector in accordance with the type of trunk selected.

In general, calls in an office of this type may be classified as intraoffice calls, outgoing calls and incoming calls.

When a subscriber originates a call, the line link frame engages an idle line marker over the line link marker connector and identifies itself to the line marker, the connector informing the line marker that a connection to an idle originating register is to be established. The line marker now proceeds to select an idle originating register group and connects to it through the originating register connector. As soon as the originating register group has been seized, the line marker connects with the line link frame through the line link frame connector and completes the identification of the calling line, a part of which is obtained through the line link marker connector. When an idle originating register group has been seized, the marker selects one of twenty channels which may be used to connect the calling subscriber with an idle originating register and selects the idle originating register which may have access to the selected channel. The line marker then operates the select and hold magnets of the switches to complete the channel and releases. The subscriber then dials the designation of the wanted line into the originating register.

When registration has been completed, the originating register seizes an idle selector marker through the originating register marker connector and transmits to the marker the dialed number. From the office code the selector marker determines whether an intraoffice call is desired or an outgoing connection.

As soon as the selector marker has been seized, the selector marker connects through the trunk link frame connector with the trunk link frame, on which the originating trunk is located.

Assuming that an intraoffice connection is indicated, the selector marker tests simultaneously for both an idle terminating trunk and an idle connecting path or channel which may be used to connect the terminating trunk with the originating trunk. The selector marker then selects an idle terminating trunk, connects the terminating trunk with the terminating register, connects itself with the terminating register through the terminating register connector, transfers the called subscriber number to the terminating register, sets up a connection between the originating trunk and the terminating trunk, informs the terminating register to seize the line marker, and then releases the originating register and itself. When the originating register is released, it releases the originating tertiary switch of the line link frame, the release of the switch in turn extending the originating secondary link of the line link frame to the originating trunk, and the talking path in the line link frame will be held by the terminating trunk via the trunk link frame and the originating trunk.

In case of an outgoing call, the originating register seizes the selector marker, which learns from the office code whether or not a sender is required and, if so, selects an idle outgoing sender of the proper type to transmit the called number to the distant office, connects the trunk with the sender over the outgoing sender link, connects itself with the sender through the outgoing sender connector, and transfers the called number to the sender. The selector marker then sets up a connection between the originating trunk and the outgoing trunk, and releases the originating register and itself. The outgoing sender then transmits the required number of digits to the distant office and releases.

An incoming call from a distant office causes the seizure of an incoming trunk which responds by connecting to an incoming register through the incoming register link. The distant office transmits the numerical designation of the called line to the incoming register. The register also records the trunk link frame number, seizes an idle selector marker through the incoming register marker connector, and transmits that numbers to the selector marker, in response to which the selector marker seizes the trunk link frame on which the incoming trunk appears. The succeeding operation is almost similar to that of an intraoffice call, the selector marker connects the incoming trunk to an idle terminating trunk, and then the line marker connects the terminating trunk to the called subscriber line.

*Detailed description*

When a subscriber originates a call, a line relay is operated and the line link frame engages an idle line marker over the line link marker connector, the connector informing the marker that a dialing connection is to be established. Upon completion of the preparation for operation, the marker is ready to select an idle originating register.

Figure 4:
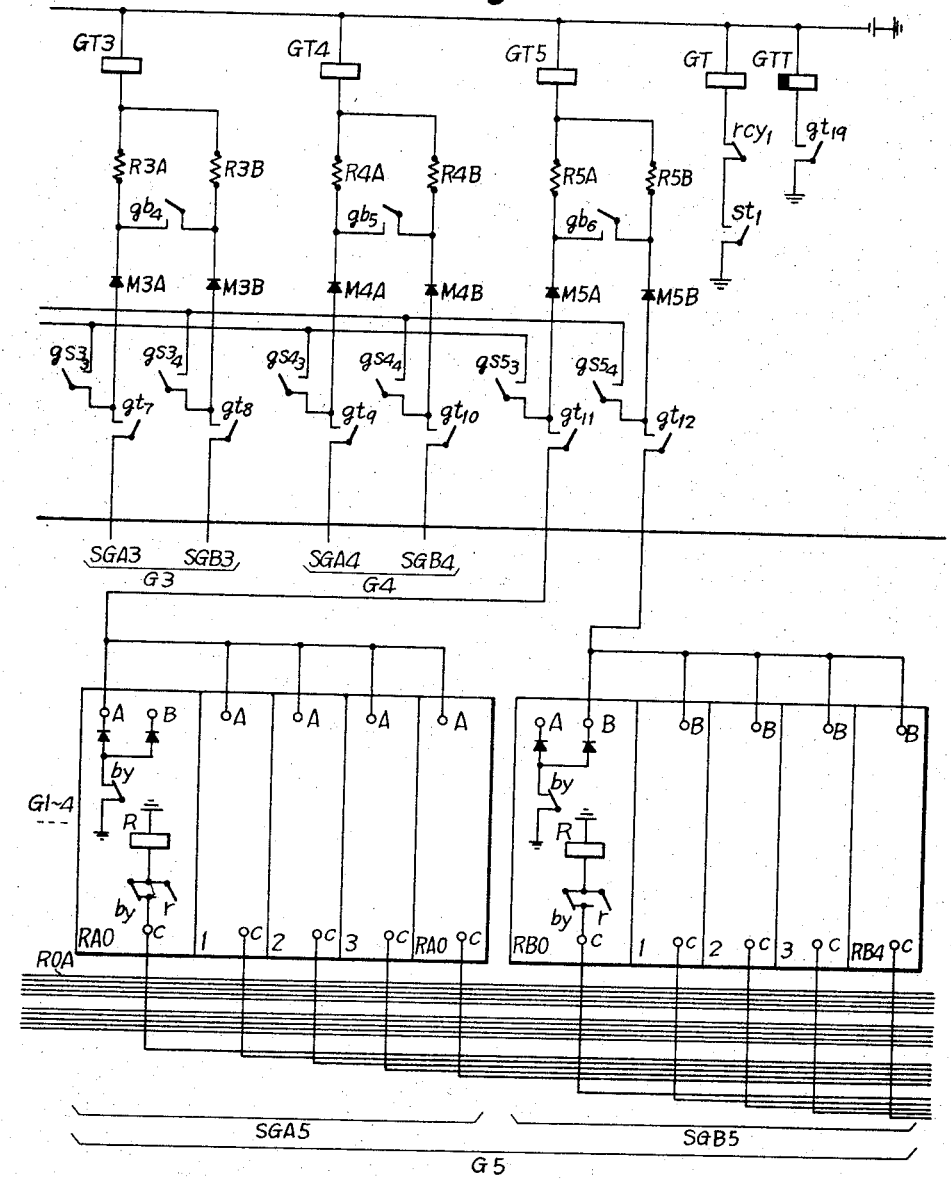

When start relay ST (not shown) is operated in the marker, it closes a circuit for operating gate relay GT of FIG. 4. The circuit for operating relay GT may be traced from battery through winding of relay GT, contact 1 of relay RCY to ground at contact 1 of relay ST. Relay GT operates in this circuit, extending register group test leads to the originating registers and extending group connector busy test leads to the originating register connectors.

Figure 13:
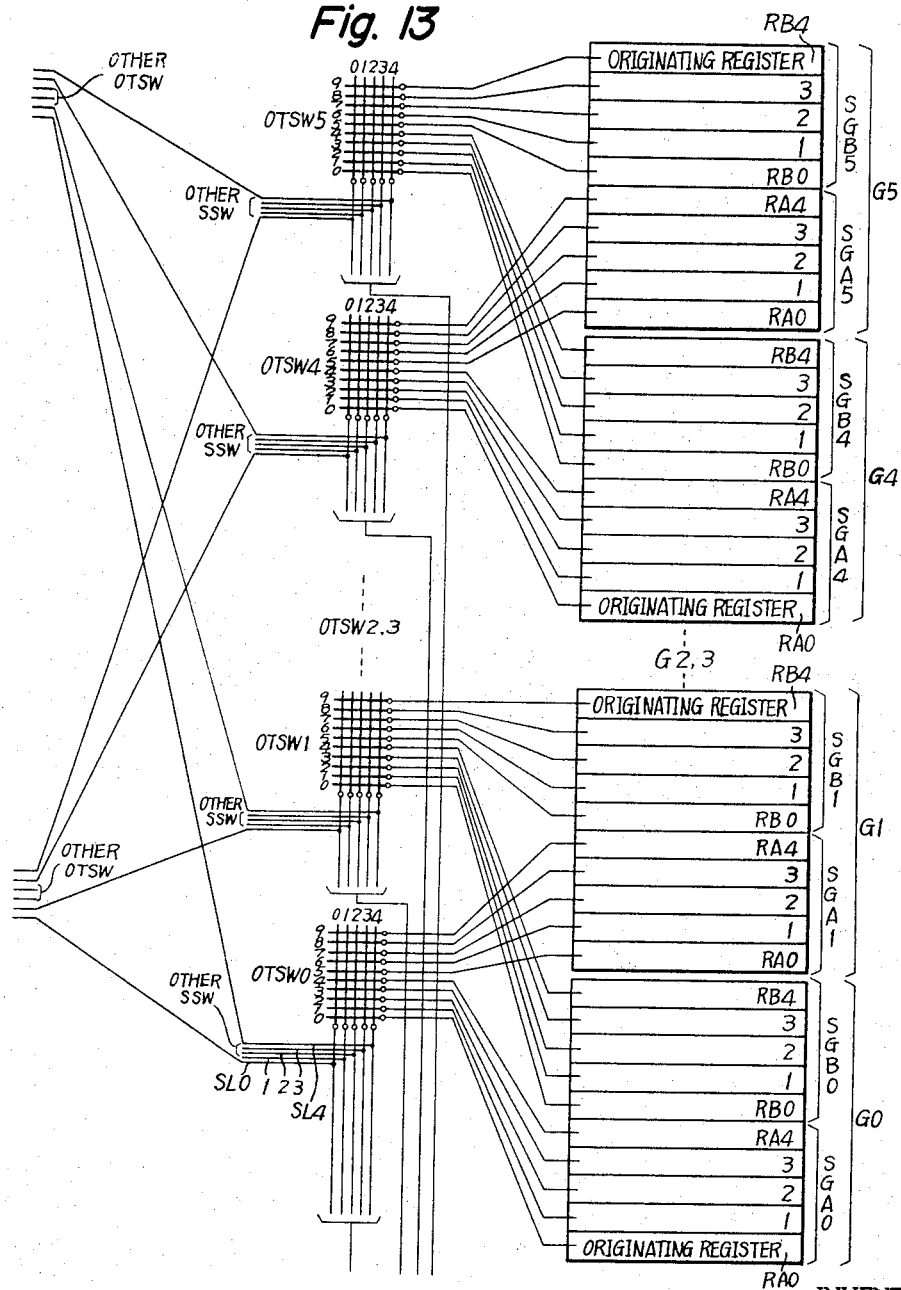

Referring now to FIG. 1 or FIG. 13, there are six originating tertiary switch units OTSW0 to OTSW5 in a line link frame, each of which has ten terminations or horizontals to which originating registers may be connected. Due to the fact that the terminations of the originating tertiary switches are connected in multiple to the associated terminations of the other line link frames (not shown), there will be a maximum of sixty originating registers. The originating registers are divided into six register groups, each of which contains a maximum of ten registers. The registers of each group are further divided into two subgroups of SGA and SGB. The details of the construction of the register groups will be shown in the following table:

| Group Construction | | Appearance | |
| --- | --- | --- | --- |
| Group | Subgroup | OTSW Number | Horizontal Number |
| G0 | SGA 0 | 0 | 0–4 |
|    | SGB 0 | 1 | 0–4 |
| G1 | SGA 1 | 0 | 5–9 |
|    | SGB 1 | 1 | 5–9 |
| G2 | SGA 2 | 2 | 0–4 |
|    | SGB 2 | 3 | 0–4 |
| G3 | SGA 3 | 2 | 5–9 |
|    | SGB 3 | 3 | 5–9 |
| G4 | SGA 4 | 4 | 0–4 |
|    | SGB 4 | 5 | 0–4 |
| G5 | SGA 5 | 4 | 5–9 |
|    | SGB 5 | 5 | 5–9 |

Returning now to the marker operations, the marker must test for and select an idle register group including one or more idle registers.

Figure 3:
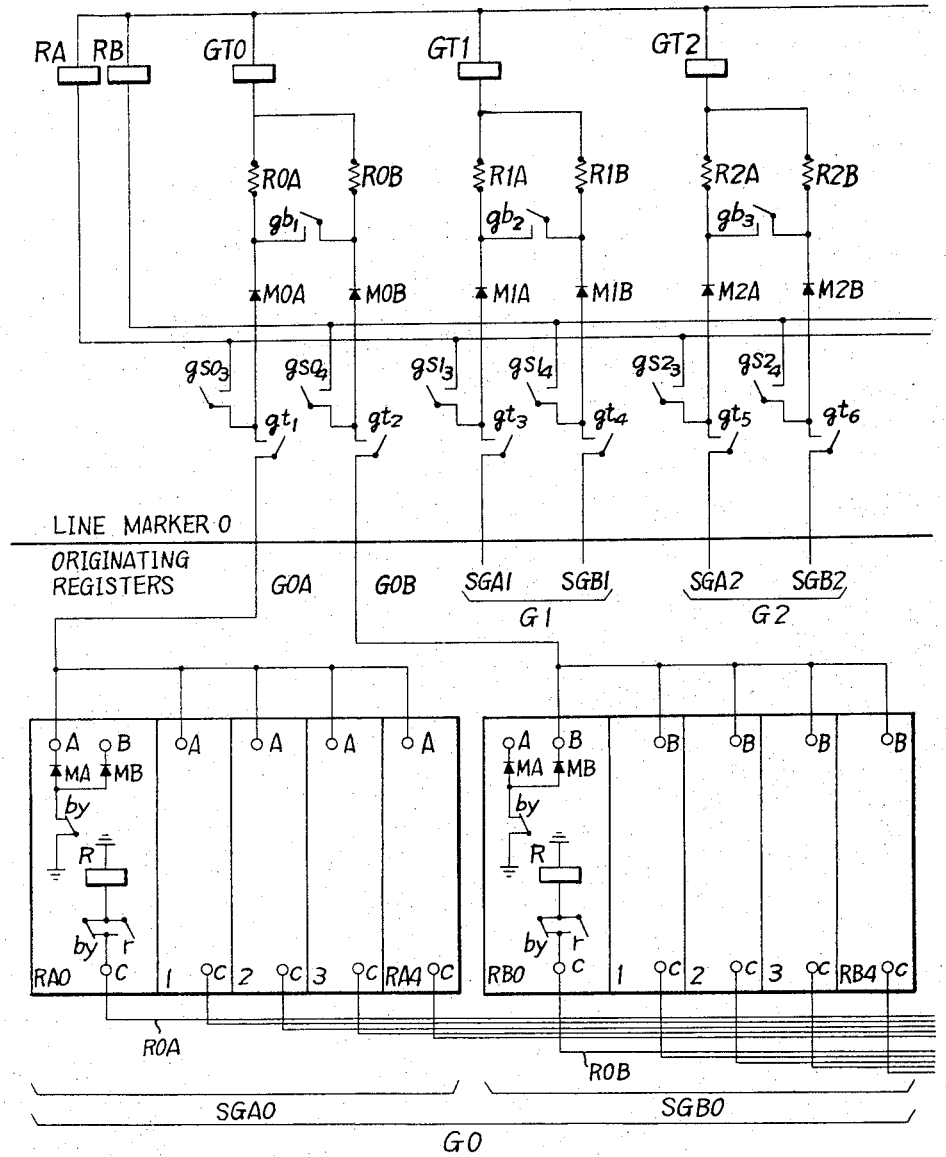
FIGS. 3, 4, 5, 6 and 7 show a control circuit for selecting an idle orginating register, corresponding originating registers and corresponding originating register connectors.

Six register group test relays GT0 to GT5 corresponding to six register groups G0 to G5 are shown in FIGS. 3 and 4. Upon the operation of relay GT, two circuits for operating relay GT0 are completed. One circuit extends from battery through winding of relay GT0, resistance R0A, rectifier M0A, contact 1 of relay GT, conductor G0A to busy test terminals A of the originating registers belonging to subgroup SGA0. The other circuit extends from battery through winding of relay GT0, resistance R0B, rectifier M0B, contact 2 of relay GT, conductor G0B to busy test terminals B of the originating registers belonging to subgroup SGB0. Similar circuits are provided for operating relays GT1 to GT5 in a similar fashion.

When a register is idle and available for use, its test terminal will be marked with ground and the corresponding test relay will be energized. Relays GT0 to GT5 are marginal relays that will not operate on current below a definite value through their windings, but will operate only on current over that value. Therefore, even if one register subgroup of the register group is idle and available for use, the resistance of the test circuit keeps the current too low to operate the group test relay. On the other hand, when both of the register subgroups of the associated register group are idle and available for use, the current through the winding of the test relay increases enough to operate that test relay. In the present description, it will be assumed that register group test relays GT0 to GT5 will be operated to indicate that each subgroup contains at least one idle and available register.

Figure 5:
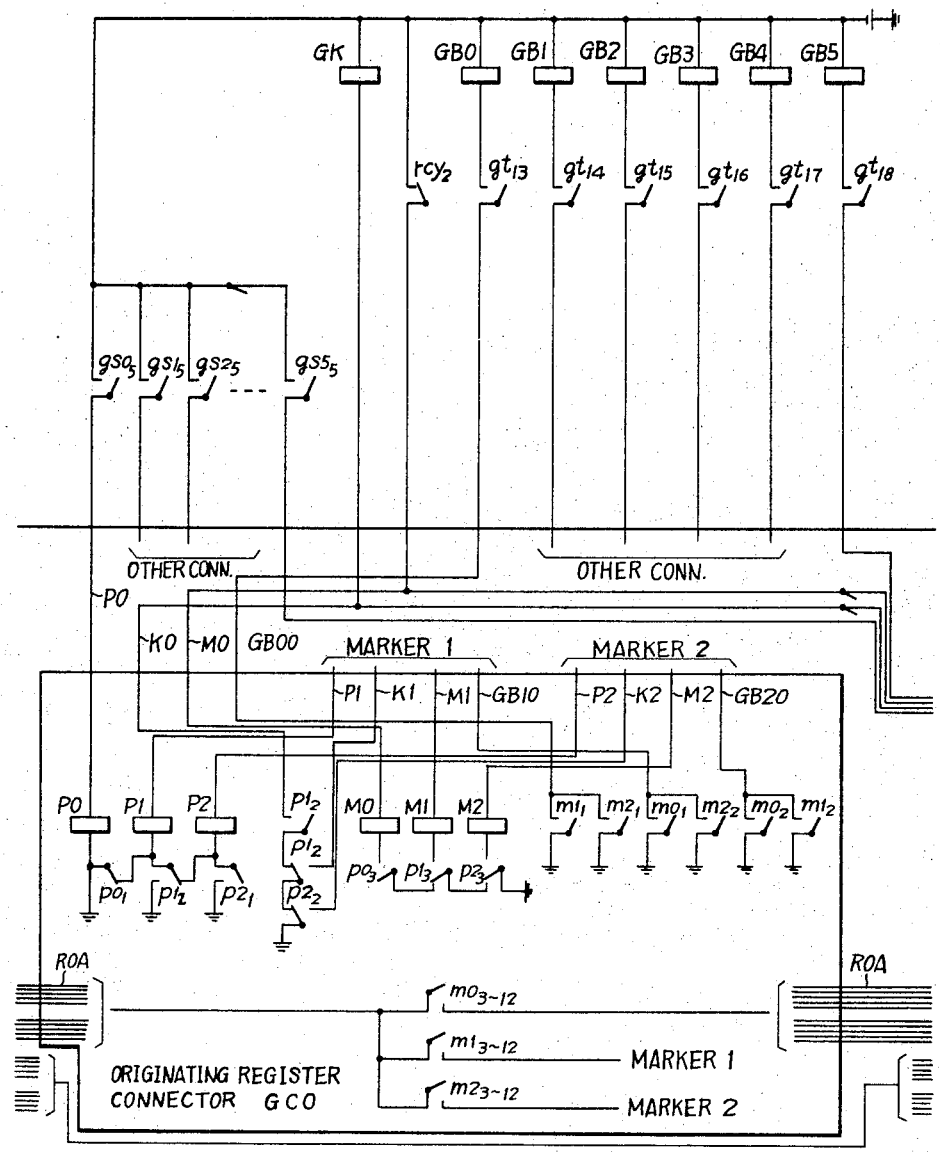

In the meantime, six connector busy test relays GB0 to GB5 corresponding to six originating register connectors GC0 to GC5 are shown in FIG. 5. With the operation of relay GT, the circuit for operating relay GB0 extends from battery through winding of relay GB0, contact 13 of relay GT, conductor GB00 to connector busy test conductor of originating register connector GC0. Whenever an originating register connector is busy with a marker, the connector relay is operated, grounding the associated test conductors. For example, in the originating register connector GC0, the operation of connector relay M1 for line marker 1 grounds conductor GB00 leading to line marker 0 and conductor GB20 leading to line marker 2. These conductors also extend to the connector busy test circuits as above described. Similar circuits are closed for the other test relays. In this explanation, assuming that all of the originating register connectors are idle, relays GB0 to GB5 will not be operated.

Figure 14:
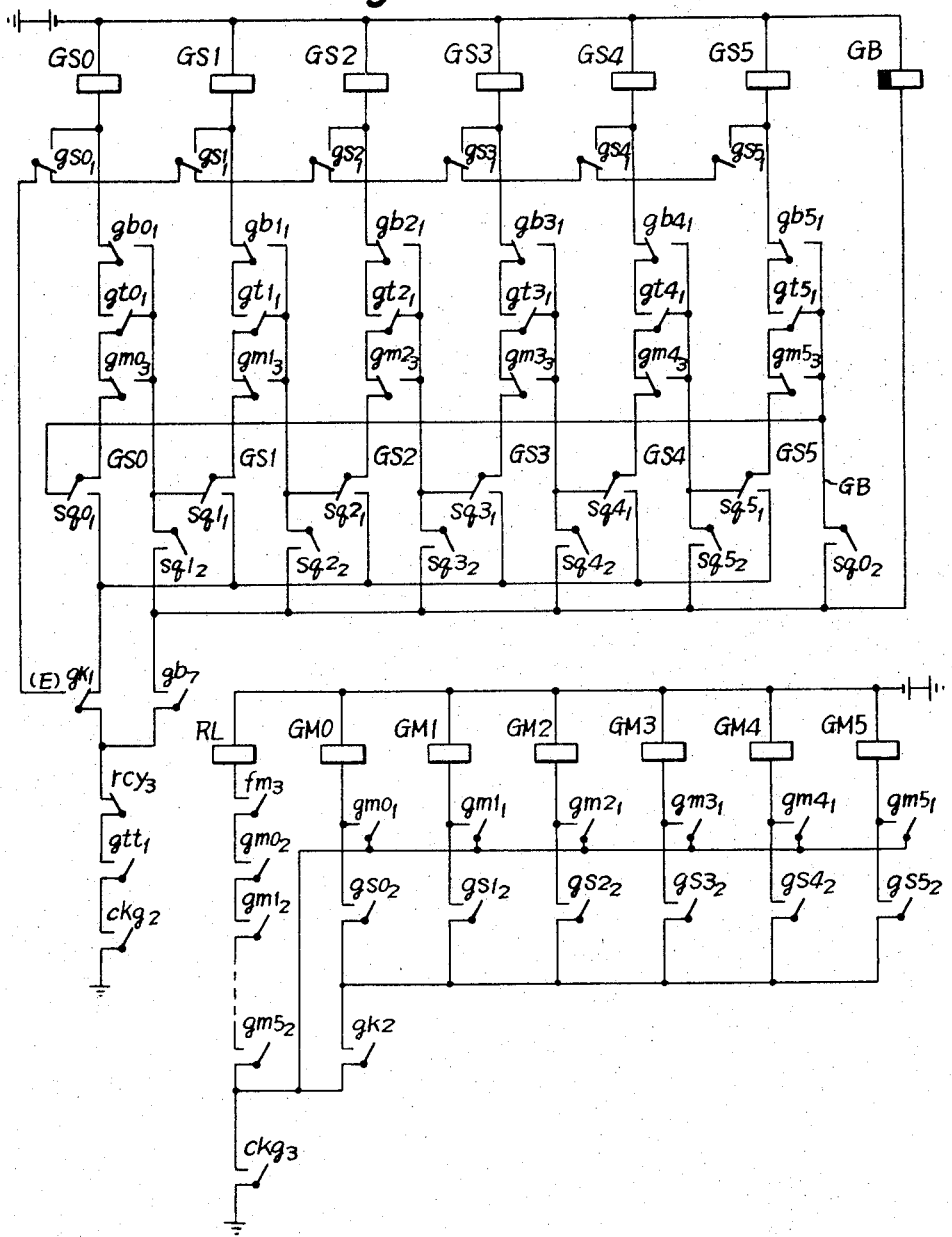
FIG. 14 shows a register group selection and memory circuit.

When these test relays are operated, the marker proceeds to select an idle register group by operating the preferred one of register group selection relays GS0 to GS5 shown in FIG. 14.

Upon the operation of relay GT, the circuit for operating group test timing relay GTT of FIG. 4 is completed. It may be traced from battery through winding of relay GTT to ground at contact 19 of relay GT. Relay GTT operates in this circuit after an interval determined by its slow operating character.

At this point, the function of sequence control is to be explained. Generally, means are provided in the marker to sequentially advance the preference for successive calls to different register groups, to different registers and to different channels. For this purpose, three sets of sequence relays, SQ0 to SQ5 (not shown), SQ0A to SQ9A (not shown) and SQ0B to SQ19B (not shown) are provided. The circuit arrangements and operations of these relays are similar to that described in United States Patent No. 2,585,904, "Crossbar Telephone System" to A. J. Busch patented on Feb. 19, 1952. In this description assuming that the marker is first put into service, sequence relays SQ0, SQ0A and SQ0B will be operated.

Returning now to the previous discussion, when relay GTT closes its contact, the circuit for selecting an idle register group is completed. It may be traced in FIGURE 14 from ground over contact 2 of relay CKG (not shown), contact 1 of relay GTT, contact 3 of relay RCY, break contact 1 of relay GK, make contact 1 of relay SQ0, conductor GS0, break contact 3 of relay GM0, make contact 1 of relay GT0, break contact 1 of relay GB0, winding of relay GS0 to battery. Relay GS0 operates in this circuit.

If relay GM0 or relay GB0 had been operated or relay GT0 had not been operated, the selecting circuit extending from ground to conductor GS0 would have been extended over make contact 3 of relay GM0 or make contact 1 of relay GB0 or break contact 1 of relay GT0, break contact 1 of relay SQ1 to conductor GS1. With relay GM1 or relay GB1 operated or relay GT1 non-operated, the circuit further extends over the similar circuit to conductor GS2. In a similar fashion, the circuit may be extended until a register group is found idle. If no available register group is idle, the selecting circuit will be extended over contacts of all test relays, conductor GB, contact 2 of relay SQ0, winding of group busy relay GB to battery. Relay GB operates in this circuit to indicate that there is no register group including an idle register in each subgroup. With relay GB operated, the circuit is completed in FIGS. 3 and 4 for connecting resistance R0A in parallel to resistance R0B. Similar circuits are completed for the other test relays. Therefore, register group test relays will now be able to operate not only when both the subgroups of the associated register group are idle, but also when one subgroup is idle. The circuit operation following the operation of register group test relays is exactly the same as previously described.

When relay GS0 is operated, the circuit for operating relays RA and RB of FIG. 3 are closed to indicate which subgroup of the selected register group is idle and available for use. The circuit for operating relay RA may be traced from battery through winding of relay RA, contact 3 of relay GS0, contact 1 of relay GT to conductor G0A, and the circuit for operating relay RB may be traced from battery through winding of relay RB, contact 4 of relay GS0, contact 2 of relay GT to conductor G0B. Since it has been assumed that each subgroup contains at least one idle and available register, relays RA and RB will both be operated by the ground of idle registers. The marker is now ready to seize the selected originating register connector.

As has been mentioned previously, there is an originating register connector individual to each register group. In each register connector, there is one marker preference relay associated with each marker to which the register group has access. In order to secure access to a register group, a marker will operate its preference relay in the selected register connector.

When relay GS0 is operated as above described, it closes the circuit in FIG. 5 extending from battery through contact 5 of relay GS0, conductor P0, winding of marker preference relay P0 individual to marker 0, to ground. Upon the operation of relay P0, it renders the marker preference relays P1 and P2 associated with the other markers ineffective while it closes a circuit to inform the marker that it has been operated. This circuit may be traced from ground over break contact 2 of relay P2, break contact 2 of relay P1, contact 2 of relay P0, through conductor K0, winding of check relay GK to battery. The operation of relay GK indicates to the marker that the marker preference relay has surely been operated. Relay P0 also closes a circuit from ground over break contact 3 of relay P2, break contact 3 of relay P1, contact 3 of relay P0, winding of connector relay M0, conductor M0, contact 2 of relay RCY to battery. Relay M0 operates in this circuit and prepares a plurality of circuits connecting the marker with the selected register group. Relay M0 at its contacts 1 and 2 grounds conductors GB10 and GB20 as previously described.

Upon the operation of relay GK, relay GS0 locks itself over make contact 1 of relay GS0, make contact 1 of relay GK and the circuit for operating register group memory relay GM0 of FIG. 14 is closed. The circuit for relay GM0 may be traced from battery through winding of relay GM0, contact 2 of relay GS0, contact 2 of relay GK to ground at contact 3 of relay CKG. Relay GM0 operates in this circuit to record the selected register group and locks itself at its contact 1.

While these operations have been in progress, the marker has also been receiving an indication of the location of the calling line so that it may seize the proper line link frame when it is ready to connect the line with the selected idle originating register.

When the line link marker connector which is individual to the line link frame operates, it identifies that frame to the marker. Since the marker is arranged to serve a plurality of line link frames, the frame number may be used for identification. With the operation of the line link marker connector relay, the associated frame number relay (not shown) is operated on the marker. In this description, it will be assumed that the calling line appears on line link frame 0 and relay FN0 (not shown) has been operated.

Each subscriber line terminates on one crossbar switch horizontal of a line link frame. Therefore to test for and select a connecting path or channel between the calling line and the selected originating register, the marker must identify the primary switch on which the calling line terminates. The circuit and action of the identification is similar to that described in United States Patent No. 2,585,904.

In this example, it will be assumed that the calling line terminates on primary switch unit PSW0 and relay PS0 (not shown) has been operated on the marker.

Figure 7:
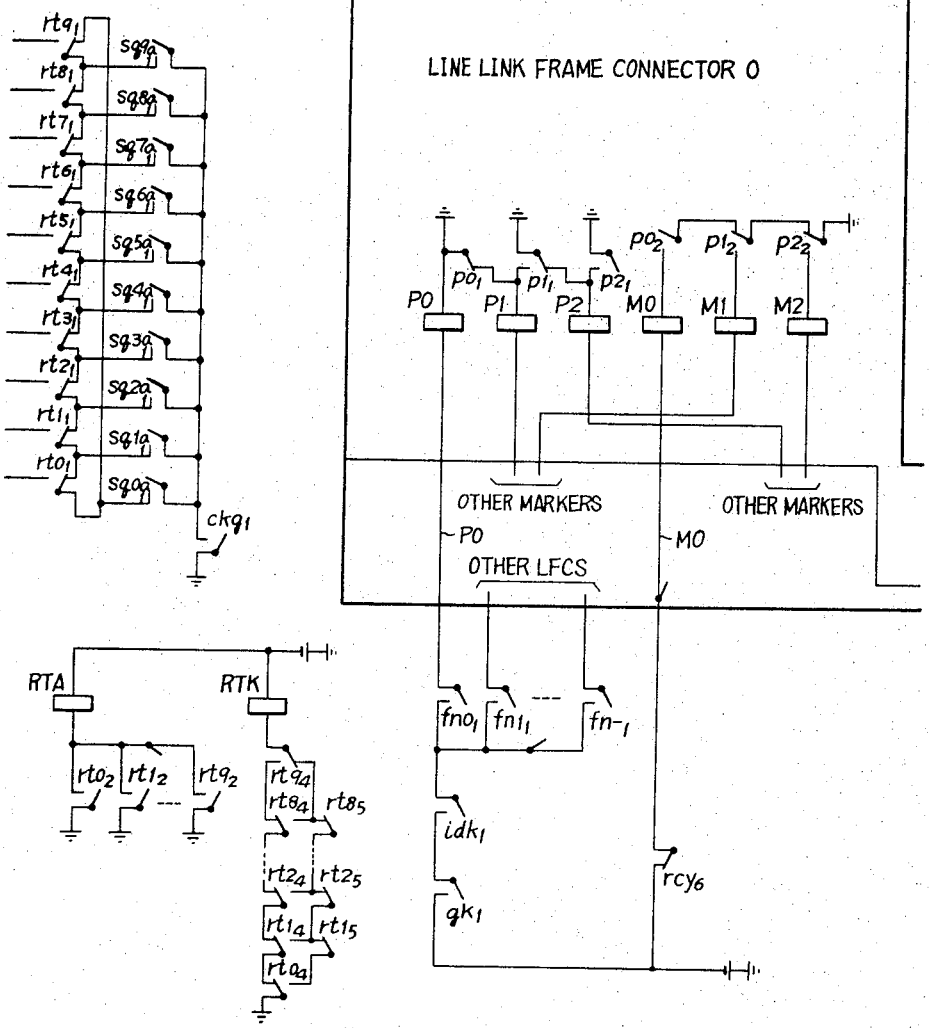

It will be remembered that relay KG has been operated to indicate that the associated preference relay has been operated. Upon the operation of relay GK, the marker initiates operation to seize the line link frame connector. In FIG. 7, that circuit may be traced from battery over contact 1 of relay GK, contact 1 of identification check relay IDK (not shown), contact 1 of relay FN0, conductor P0, winding of marker preference relay P0 to ground. Relay P0 operates in this circuit and closes the circuit for operating connector relay M0. It may be traced from ground through break contact 2 of relay P2, break contact 2 of relay P1, contact 2 of relay P0, winding of relay M0, conductor M0, contact 6 of relay RCY to battery. Relay M0 operates in this circuit and prepares a plurality of circuits connecting the marker with the line link frame. The circuit arrangement and operation of the line link frame connector is exactly the same as that of the originating register connector as previously mentioned.

The marker now proceeds to select an idle connecting path or channel by which the calling line may be connected to the selected register group. In the selection of such a path, the marker must perform the following functions, namely: select the ten primary links by which the calling line may be extended to the five secondary switches; select the ten tertiary links which have access to the selected register group; test for and select an idle channel comprising an idle primary link and an idle secondary link.

To determine if a particular channel through which it is possible to connect a calling subscriber line to an originating register group is idle and available for use, it is necessary to test the particular primary link and secondary link associated with this channel for an idle condition. If any one of these elements is busy, the entire channel is unavailable. The marker is, therefore, equipped to simultaneously test twenty separate channels between a particular subscriber line and an idle register group.

However, before it is possible to test for idle channels, the marker must determine which channels should be selected for testing and must then determine the elements associated with these channels. After the primary link and the secondary link associated with each channel have been determined, the marker may proceed to test for idle channels.

The group of primary links associated with twenty channels to be tested for is determined by location of the calling line. In the previous description it has been assumed that the calling line appears on the primary switch unit PSW0 and relay PS0 (not shown) has been operated in the marker.

Figure 8:
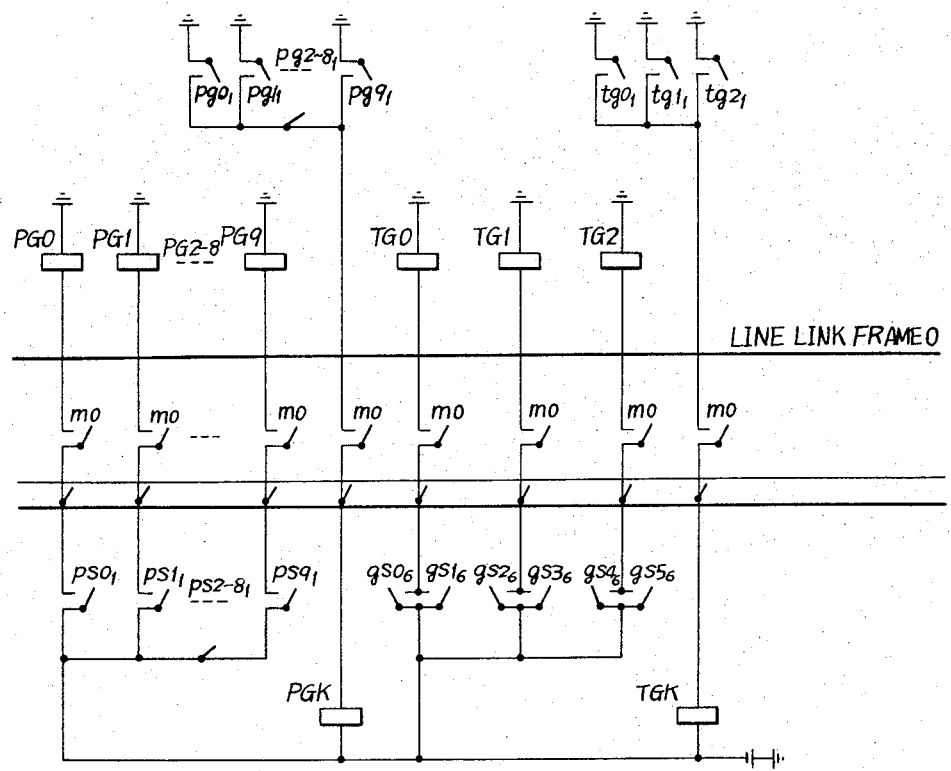

When the line link frame connector relay is operated as above described, circuits for primary group relay PG0 and tertiray group relay TG0 are closed in FIG. 8. The circuit for operating relay PG0 may be traced from battery through contact 1 of relay PS0, contact of line link frame connector relay M0, winding of relay PG0 to ground. The circuit for operating relay TG0 may be traced from battery through contact 6 of relay GS0, contact of line link frame connector relay M0, winding of relay TG0 to ground. Relays PG0 and TG0 are thus operated, providing the test circuits for links. The testing circuits for the idle channels are made in accordance with the following table:

| Channel Number | Elements of Channel | |
|---|---|---|
| | Primary Link Number | Secondary Link Number |
| 0A | PL0 | SL0 |
| 0B | PL0 | SL5 |
| 1A | PL1 | SL0 |
| 1B | PL1 | SL5 |
| 2A | PL2 | SL1 |
| 2B | PL2 | SL6 |
| 3A | PL3 | SL1 |
| 3B | PL3 | SL6 |
| 4A | PL4 | SL2 |
| 4B | PL4 | SL7 |
| 5A | PL5 | SL2 |
| 5B | PL5 | SL7 |
| 6A | PL6 | SL3 |
| 6B | PL6 | SL8 |
| 7A | PL7 | SL3 |
| 7B | PL7 | SL8 |
| 8A | PL8 | SL4 |
| 8B | PL8 | SL9 |
| 9A | PL9 | SL4 |
| 9B | PL9 | SL9 |

As previously mentioned, each horizontal path and each vertical path of the crossbar switch units includes three wires, namely ring wire, tip wire and sleeve wire, but only the sleeve wire will be shown in FIGS. 12 and 13.

Figure 9:
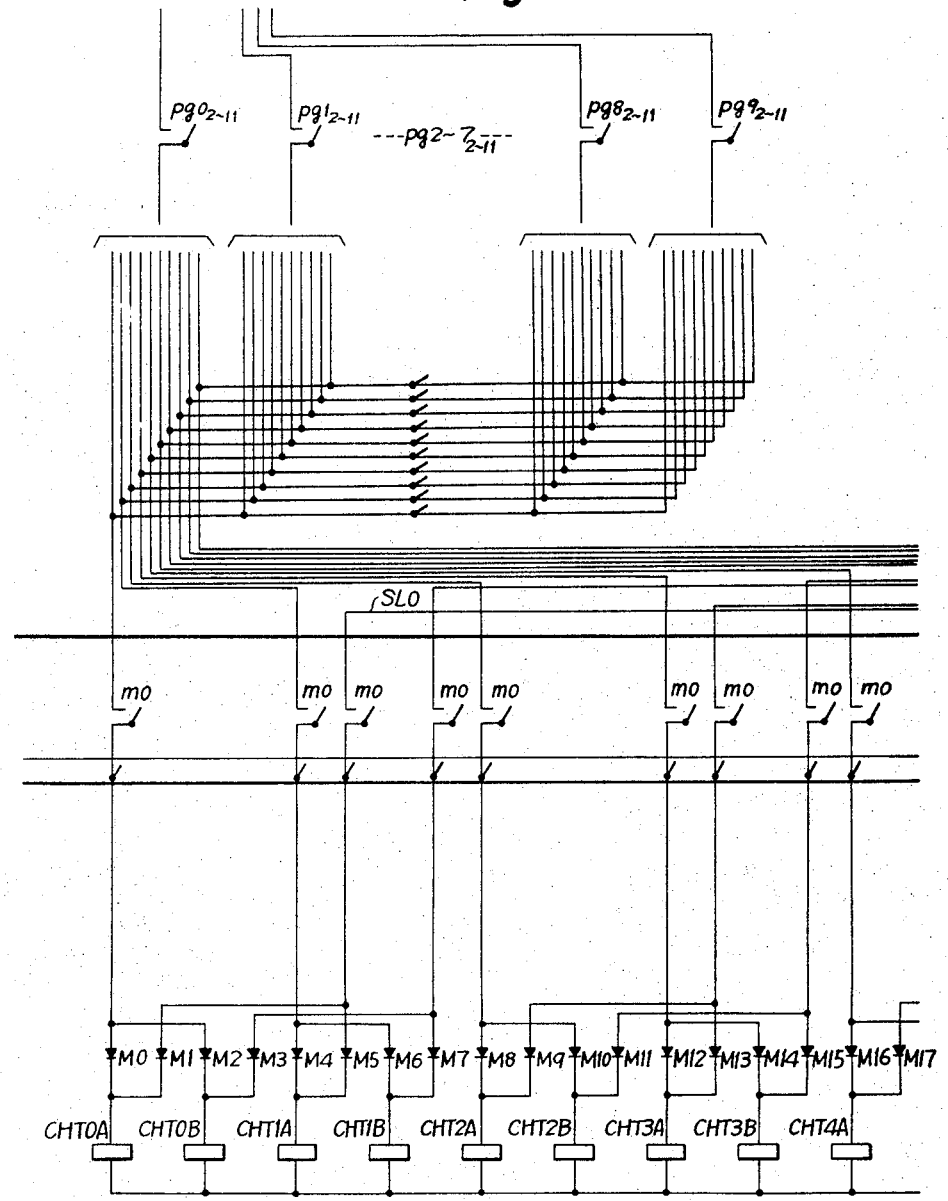
Figure 10:
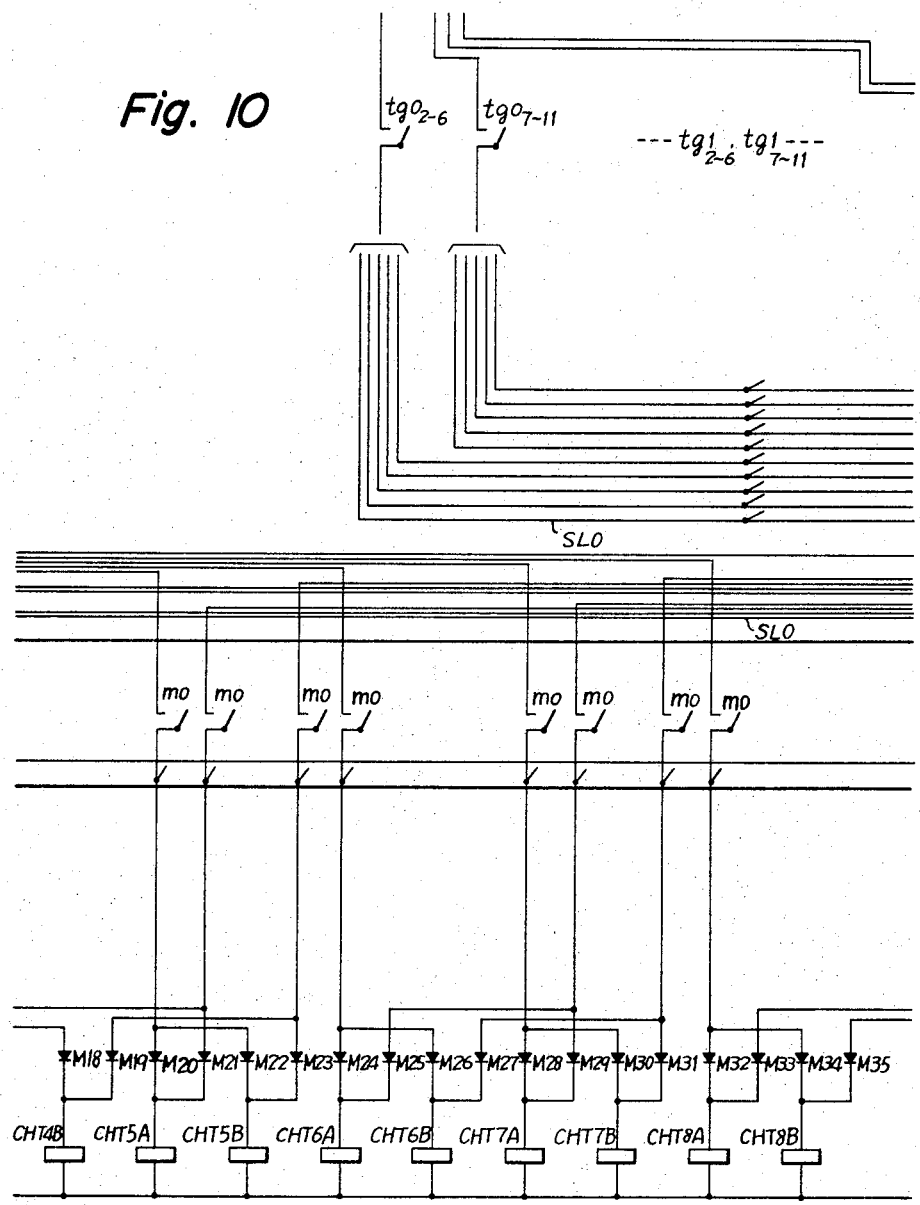
Figure 11:
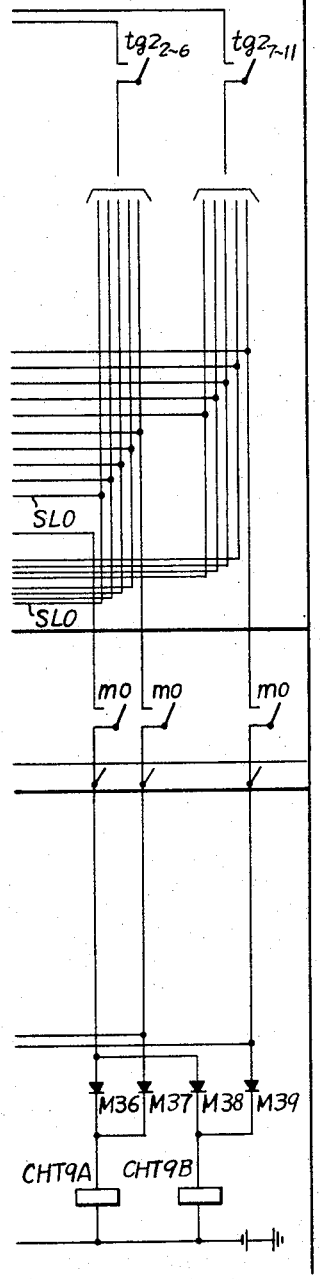
Figure 19:
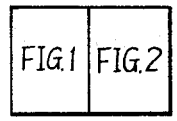
FIG. 19 is a diagram showing the arrangement of FIGS. 1 and 2.

As best seen in FIGURES 9 and 12, the test circuit for primary link PL0 may be traced from the sleeve wire of that link over contact 2 of relay PG0, contact of frame connector relay M0, rectifier M0, winding of test relay CHT0A to battery. As shown in FIGURES 9 through 13, the test circuit for secondary link SL0 may be traced from the sleeve wire of that link over contact 2 of relay TG0, conductor SL0, contact of frame connector relay M0, rectifier M1, winding of test relay CHT0A to battery. When a link is busy, its sleeve wire will be marked with ground and the corresponding test relay will be operated. Therefore relay CHT0A will be operated when one or both links are busy. Similarly, in accordance with the above table, test circuits are closed for the other links of twenty channels.

Assuming that all channels are idle and available for use, no test relay will be operated.

In order to delay the selection of a channel until after all of the test relays for the channel elements have had a sufficient time in which to operate, a time interval is measured following the operation of timing relay CHT before selection circuit is closed.

When relays PG0 and TG0 are operated, the circuits for operating relays PGK and TGK of FIG. 8 are completed. The circuit for relay PGK may be traced from ground over contact 1 of relay PG0, contact of frame connector relay M0, winding of relay PGK to battery, while the circuit for relay TGK may be traced from ground over contact 1 of relay TG0, contact of frame connector relay M0, winding of relay TGK to battery. Relays PGK and TGK operate these circuits, completing the circuit for operating relay CHT. Slow operating relay CHT is energized in this circuit to close its contact.

Figure 15:
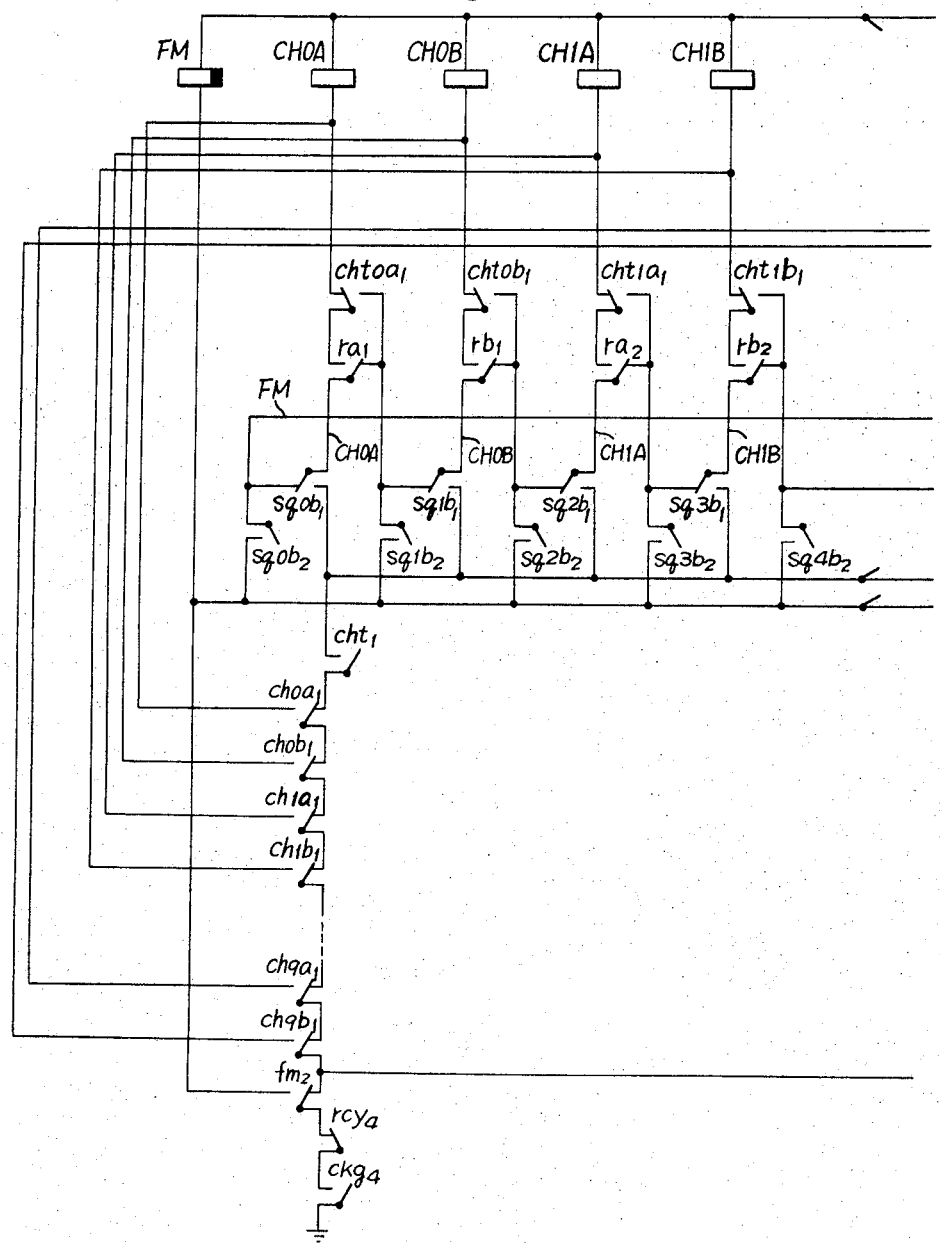
FIGS. 15 and 16 show a channel selection circuit.
Figure 16:
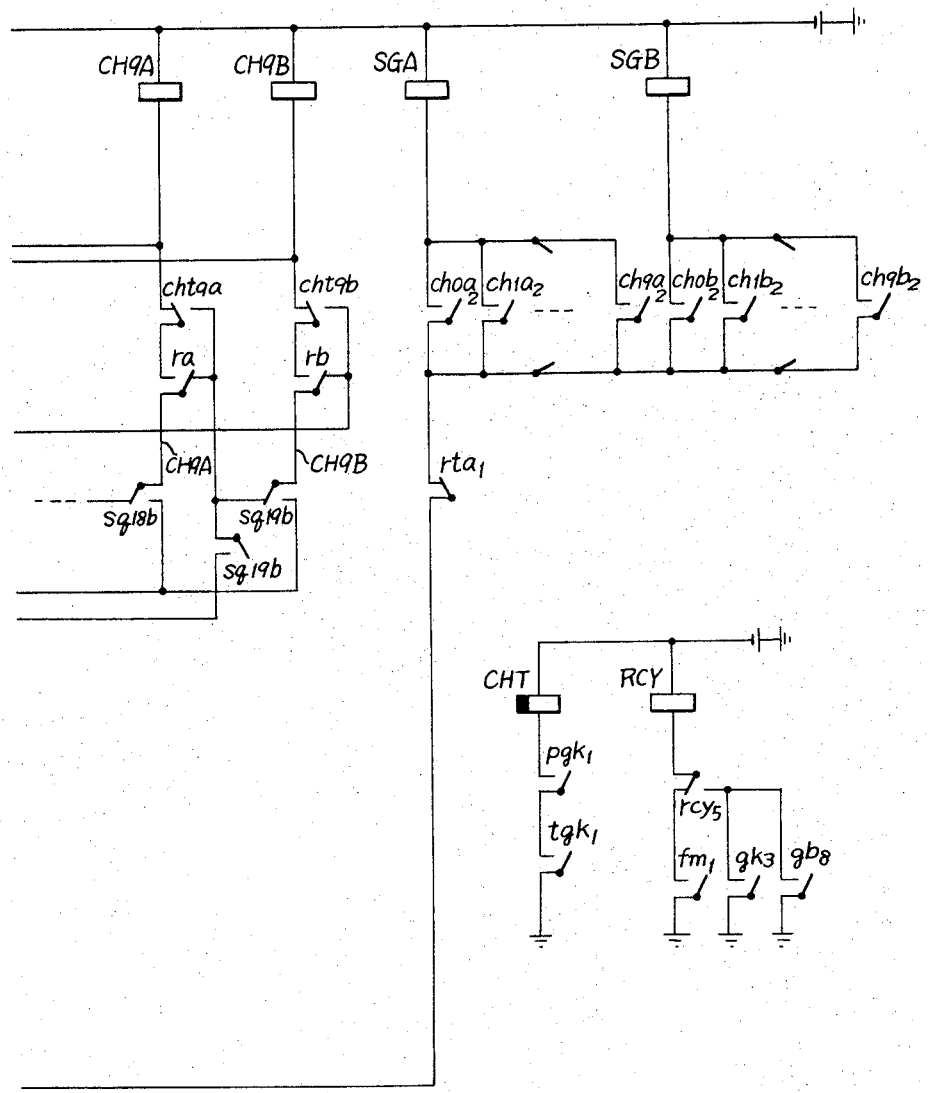

When relay CHT closes its contact it completes a circuit for selecting an idle channel by operating the preferred one of the twenty channel relays CH0A to CH9B of FIGS. 15 and 16. This circuit may be traced from ground over contact 4 of relay CKG, contact 4 of relay RCY, break contact 2 of relay FM, series break contact 1 of relays CH9B to CH0A, contact 1 of relay CHT, make contact 1 of relay SQ0B (as previous assumption), conductor CH0A, make contact 1 of relay RA, break contact 1 of relay CHT0A, winding of relay CH0A to battery. Relay CH0A operates in this circuit, it locking itself over make contact 1 of relay CH0A, series break contact 1 of the other selection relays to the same circuit as above traced.

If relay CHT0A had been operated or relay RA had not been operated, the selecting circuit extending from ground to conductor CH0A would have been extended over break contact 1 of relay RA or make contact 1 of relay CHT0A, break contact 1 of relay SQ1B to conductor CH0B. With relay CHT0B operated or relay RB non-operated, the circuit further extends to conductor CH1A. In a similar fashion the circuit may be extended until a channel is found idle, when the corresponding channel relay may be operated in a manner similar to that of operating relay CH0A.

If no available channel is idle within selected twenty channels, the channel selecting circuit will be extended over make contacts of the channel test relays or break contacts of relays RA and RB, winding of failure matching relay FM of FIG. 15 to battery. The operation of relay FM initiates channel retest which will be described below.

With operation of relay FM, the circuit for operating recycle test relay RCY is closed. As shown in FIGURE 16, it may be traced from battery through winding of relay RCY, break contact 5 of relay RCY, to ground at contact 1 of relay FM. Relay RCY operates in this circuit and locks itself over its make contact 5, parallel contact 3 of relay GK and 8 of relay GB. The operation of relay RCY causes the release of the circuits concerned with the register group selection and the channel selection.

When relay RCY is operated, it opens the circuit of relay GT, connector relays M0 of the originating register connector, relay M0 of the line link frame connector, relay GS0, relay GB if operated, and relay FM. Relay GT in releasing in turn releases register group test relays GT0 to GT5, relays RA and RB if operated, connector busy test relays GB0 to GB5 if operated, and relay GTT, while line link frame connector relay M0 releases relays PG0, PGK, TG0 and TGK. The release of relay GS0 causes the release of relay GK which in turn releases relay P0 of the line link frame connector. Finally, when relays GK and GB are released, they open the circuit for relay RCY which in turn closes the circuit for operating relay GT. The marker has now been restored to the state before the selection of an idle originating register group and is ready to initiate the idle originating register group retest.

The marker in this description is designed to be able to repeat such action a maximum of six times.

Returning now to the normal operation, when relay CH0A is operated, the circuit for operating relay SGA of FIG. 16 is closed. It may be traced from battery through winding of relay SGA, contact 2 of relay CH0A, contact 1 of relay RTA, break contact 2 of relay FM, contact 4 of relay RCY to ground at contact 4 of relay CKG. The operation of relay SGA indicates that the selected channel has access to tertiary switch unit OTSW0 and therefore the marker must select an idle originating register belonging to subgroup SGA0. On the other hand, if relay SGB is operated the selected channel has access to tertiary switch unit OTSW1 and the marker must select an idle originating register belonging to subgroup SGB0.

Figure 6:
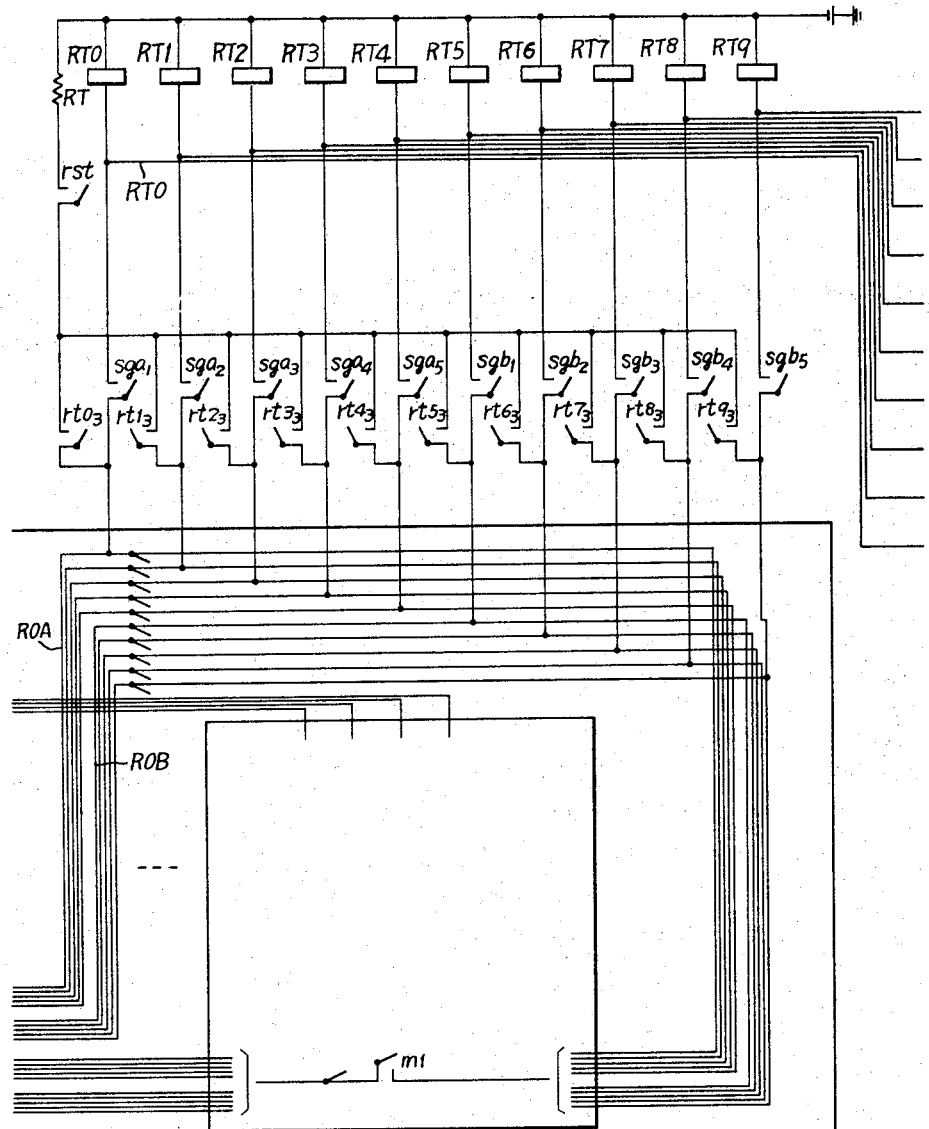

Upon the operation of relay SGA, register test leads are extended to the originating registers over selected originating register connector GC0. In FIG. 6, there are ten register test relays RT0 to RT9 corresponding to a maximum of ten registers RA0 to RA4 and RB0 to RB4 of the register group. With relay SGA operated, the circuit for operating relay RT0 is closed. It may be traced from battery through winding of relay RT0, contact 1 of relay SGA, conductor R0A of FIG. 6, conductor R0A of FIG. 5, contact 3 of register connector relay M0, conductor R0A of FIG. 4, conductor R0A of FIG. 3 to busy test terminal C of originating register RA0 of register group G0. Similar circuits for operating relays RT1 to RT4 are closed over contacts 2 to 5 of relay SGA. When a register is idle and available for use, its test terminal will be marked with ground through winding of register start relay R. In the present example, since it has been assumed that registers RA0 to RA4 are idle and available for use, each of relays RT0 to RT4 will be operated in series with relay R, but marginal relay R will now not be operated because resistance of winding of relay RT0 keeps the current too low to operate it. When one or more test relays are operated, the circuit for operating relay RTA of FIG. 7 is closed over contacts 2 of those test relays. The operation of relay RTA opens the circuit for operating relay SGA, which in turn opens the register test circuits. At this point, the test relays all release except the one which has been provided with the locking circuit. In this description, since it has been assumed that sequence relay SQ0A has been operated, relay RT0 remains operated. The locking circuit for relay RT0 may be traced from battery through winding of relay RT0, conductor RT0, make contact 1 of relay RT0 of FIG. 7, contact 1 of relay SQ0A, to ground at contact 1 of relay CKG. This action causes the operation of one-out-of-ten check relay RTK. The circuit for operating relay RTK may be traced in FIG. 7 from ground over make contact 4 of relay RT0, series break contacts 5 of relays RT1 to RT9, winding of relay RTK to battery. The operation of relay RTK indicates that the selection of an idle register has just been completed.

After the selection of an idle channel and an idle register has been completed, the line marker will proceed to set up this selected connecting path by operating the select magnets on the line link frame which are associated with the selected channel and operating the hold magnets associated with the selected channel after the select magnets are operated. In the present example, the following magnets (not shown) will be operated: the select magnet of primary switch unit PSW0 which is associated with the horizontal connected with the calling line; hold magnet HM0 of primary switch unit PSW0; select magnet RSM0 of secondary switch unit SSW0; hold magnet HM0 of secondary switch unit SSW0; select magnet SM0 of tertiary switch unit OSTW0; hold magnet HM0 of tertiary switch unit OTSW0.

The line marker then makes several tests on the tip, ring and sleeve wire of the selected channel, such as false cross and ground test, continuity test and double connection test. When the marker succeeds in these tests and is secure that no trouble has taken place, the marker releases. These actions are similar to that described in United States Patent No. 2,585,904.

When the required number of the originating registers is less than sixty, there are dead or not used horizontals of the originating tertiary switches. For example, in the case of thirty originating registers the half of the horizontals of the originating tertiary switches are not used. In order to use these dead horizontals effectively, the multiple connection between different originating tertiary switch units is employed in this system.

Figure 17:
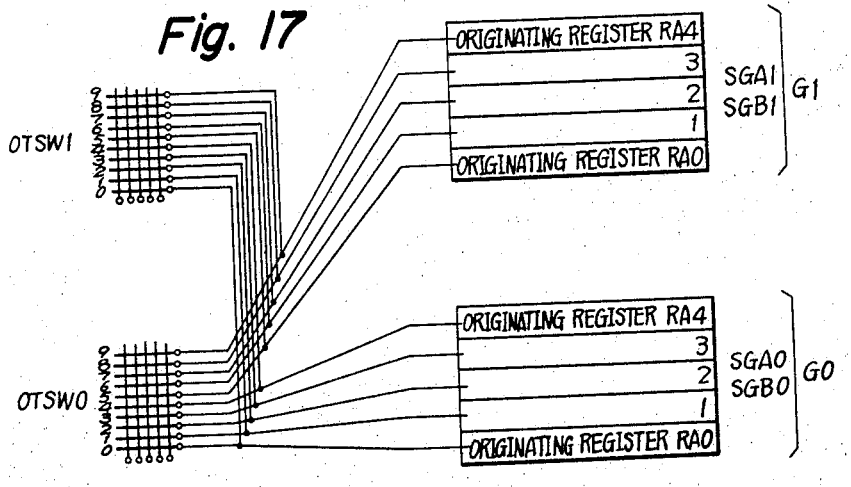
FIGS. 17 and 18 show the method of making a multiple connection.

FIG. 17 shows an embodiment of the invention in which the horizontals of originating tertiary switch unit OSTW0 are connected in multiple to the associated horizontals of originating tertiary switch unit OTSW1. Each register group includes five originating registers RA0 to RA4, each of which has access to the horizontals of the switch units OTSW0 and OTSW1. For example, originating register RA0 of register group G0 is connected with horizontal 0 of originating tertiary switch unit OTSW0 and connected in multiple with horizontal 0 of switch unit OTSW1. Therefore, if register RA0 of register group G0 is idle and available for use, the marker will be able to use twenty channels, while in the case of the single connection the marker will be able to use only ten channels. In other words, this may be equivalent to an arrangement that there is included in originating register RA0 an imaginary originating register RB0 of register group G0 wherein its busy-idle condition is the same as that of register RA0.

Figure 18:
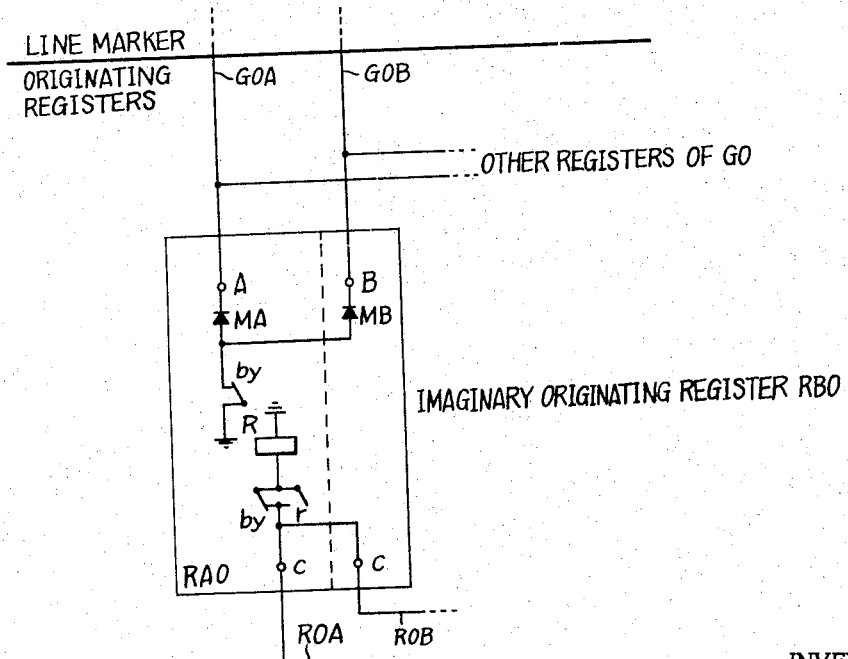

The circuit arrangement for testing for an idle register group is as shown in FIG. 18. The terminal A of register RA0 is connected with test conductor G0A while the terminal B of register RA0 is connected with test conductor G0B. When relay GT is operated on the marker as previously described and if register RA0 is idle and available for use, both of its terminals A and B will be marked with ground and corresponding test relay GT0 will be operated to indicate that both of subgroups SGA0 and SGB0 contain at least one idle and available register. With the selection of an idle register group finished and with relay GS0 operated, both of relays RA and RB are operated to indicate that it may be possible to select any idle channel of twenty channels. These circuits are the same as previously traced.

The terminal C of the register RA0 is also connected with register test conductor R0A extending over contact of the originating register connector relay to register test relay RT0 on the marker and connected with register test conductor R0B extending over contact of the same connector relay to register test relay RT5 associated with imaginary register RB0. Therefore, the marker can match any idle channel of twenty channels and any idle register of the selected register group.

The circuit arrangement and operation of the other switch units OTSW2 to OTSW5 and other registers is the same as that of the example described above.

On the other hand, if it is necessary to increase the number of originating registers after the multiple connection, it may be done by replacing the imaginary originating registers with the real originating registers. To cite the example of register RA0, the following connection must be removed: the multiple connection between horizontal 0 of originating tertiary switch unit OTSW0 and horizontal 0 of originating tertiary switch unit OTSW1; the connection between terminal B of register RA0 and register group test conductor G0B; the connection between terminal C of register RA0 and register test conductor R0B. In addition, the following connection must be made: the connection between horizontal 0 of originating tertiary switch unit OTSW1 and register RB0; the connection between terminal B of register RB0 and register group test conductor G0B; the connection between terminal C of register RB0 and register test conductor R0B. The circuit arrangement concerned with registers RA0 and RB0 of register group G0 is now the same as that of FIG. 3.

As mentioned above, the multiple connection can readily and simply be effected by modifying several connections concerned with the originating register.

It is to be understood that the above described embodiment is merely illustrative of the application of the principle of the invention. Various other modifications may be made by those skilled in the art without departing from the spirit and scope of the invention.

We claim:

1. In a switching system including a multistage switching frame having a plurality of switch units in each stage and links connecting each switch unit of the first stage with each switch unit of the last stage through at least one intermediate stage existing therebetween to thereby form a plurality of channels, a plurality of inlets connected to said switch units of said first stage and plurality of outlets from each switch unit of said last stage, said outlets of each switch unit being divided into at least first and second sub-groups, each sub-group of a switch unit being associated with a sub-group of another switch unit to form outlet groups and a plurality of common control means for establishing interconnection between a given input and an available outlet, each common control means comprising selection means for selecting one of said outlet groups having at least one idle and available individual outlet means within said common control means responsive to said selection means for preventing selection of said one selected outlet group having at least one idle and available individual outlet by other common control means, testing means for testing the busy-idle condition of said links in combinations forming said plurality of channels, connecting means responsive to said selection means for connecting said testing means to only those links forming part of channels connectable to said given input and said selected outlet group, additional means within said common control means responsive to said testing means for selecting one combination of idle links forming a channel from those combinations indicated as being available by said testing means, outlet determining means responsive to said additional means for selecting an idle individual outlet within a sub-group of said selected outlet group, and means for connecting said selected channel between said given input and said selected outlet.

2. A system as defined in claim 1 further including an individual register available to each respective outlet and a register connector means provided for each outlet group for connecting said registers to said common control means, said means within said common control means responsive to said selection means being provided as a part of said register connector means.

3. A system as defined in claim 2 wherein said common control means includes first relay means for determining the busy-free condition of each register connector means, said selection means being responsive to said first relay means in its selection of a group of outlets.

4. A system as defined in claim 3 wherein said selection means includes second relay means for indicating each group of outlets having an idle and available individual outlet in each sub-group thereof and third relay means for selecting one available group of outlets in response to said first and second relay means.

5. A system as defined in claim 4 wherein said testing and selection means includes fourth relay means responsive to inability of said third relay means to detect an outlet group having a free outlet in each sub-group and a free register connector associated therewith for actuating said second relay means to indicate each group of outlets having an idle individual outlet in either sub-group.

6. A system as defined in claim 4 wherein said testing means includes fourth relay means including a plurality of relays each provided for determining the busy-idle condition of one link combination forming a channel, and switch means selectively connecting said fourth relay means to those links forming channels between a given input and a selected outlet group.

7. A system as defined in claim 6 wherein said additional means includes fifth relay means responsive to said fourth relay means for selecting one combination of links forming an available channel between said given inlet and said selected outlet group.

8. A system as defined in claim 7 wherein said additional means is responsive to said selection means to prevent selection of a combination of available links forming a channel extending to a sub-group of the selected output group not having an available outlet.

9. A system as defined in claim 7 wherein said outlet determining means includes sixth relay means responsive to said fifth relay means for testing the outlets of a selected sub-group for availability to an idle register.

10. A system as defined in claim 1 wherein the corresponding outlets in the sub-groups of each outlet group are connected together to form outputs, and further including a group of registers provided for each outlet group, including a register connected to each output of the respective outlet group.

References Cited

UNITED STATES PATENTS

| | | | |
|---|---|---|---|
| 2,585,904 | 2/1952 | Busch | 179—18 |
| 2,813,929 | 11/1957 | Oberman | 179—22 |
| 3,313,888 | 4/1967 | Ohno | 179—22 |

KATHLEEN H. CLAFFY, *Primary Examiner.*

LAURENCE A. WRIGHT, *Assistant Examiner.*